April 22, 1941.  J. B. CARROLL  2,238,990
PRICE TICKET AND THE LIKE
Filed Jan. 2, 1940
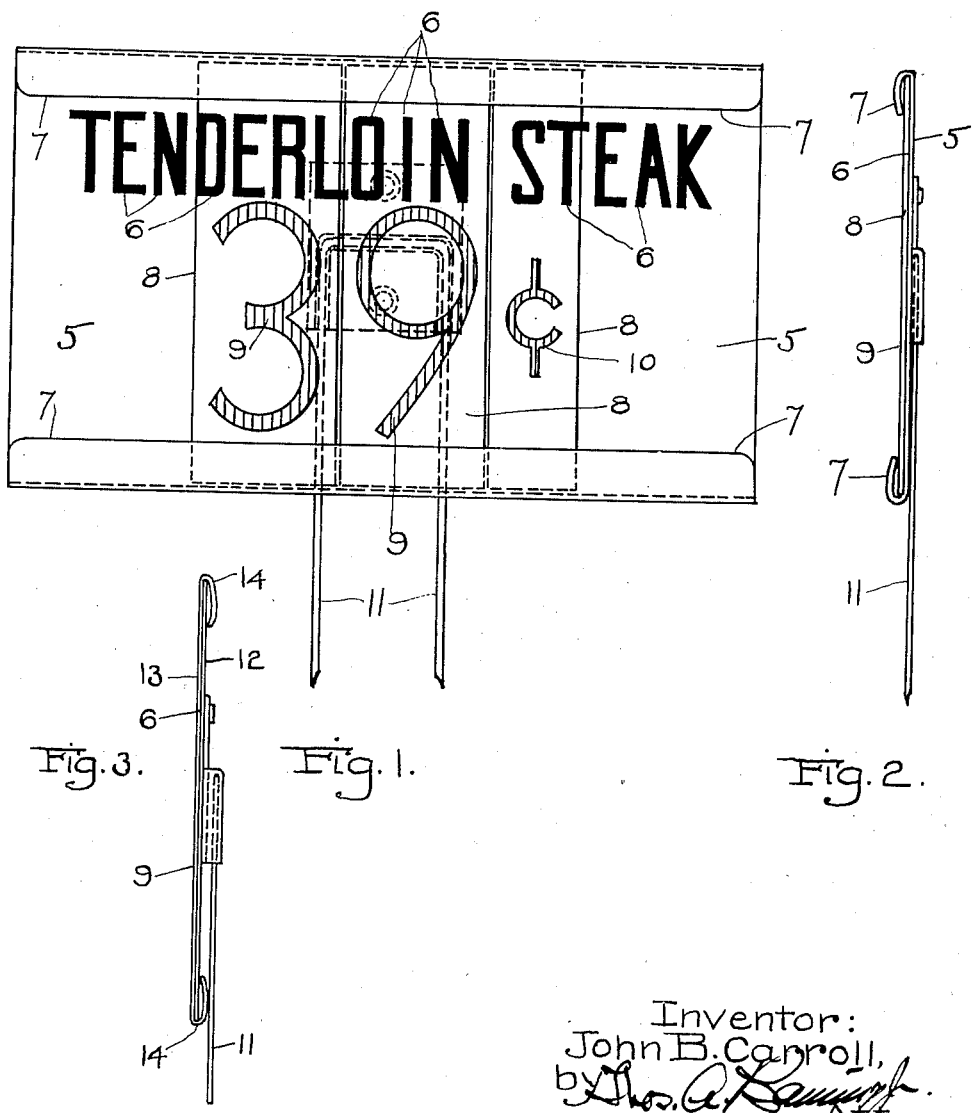
Inventor:
John B. Carroll,
by Thos. A. Banning
Atty.

Patented Apr. 22, 1941

2,238,990

UNITED STATES PATENT OFFICE 2,238,990

PRICE TICKET AND THE LIKE

John B. Carroll, Chicago, Ill.

Application January 2, 1940, Serial No. 312,089

2 Claims. (Cl. 40—5)

This invention relates to improvements in price tickets and the like. The price tickets herein disclosed are intended for use in connection with articles of merchandise and the like, and one object of the invention is to provide a price ticket of the foregoing type which may be directly attached to the article to which it refers. A further object is to provide a price ticket of such form that different slips designating prices of the articles may be inserted into the holder from time to time, so that the indicated prices of the articles may be varied from time to time according to the needs of the display.

A further and very important feature of the invention is to provide a price ticket of such arrangement that the name or designation of the article may be permanently imprinted on the holder, say for "Tenderloin steak," and then the price slips themselves may be slipped into this holder or removed therefrom and new ones substituted from time to time, according to the varying or changing prices of such tenderloin steak, or other article. By this means I make it possible to use a given holder for a specified article of merchandise, and use in connection with such holder various price slips according to the varying needs of the market prices of such article.

In connection with the foregoing feature, I have provided an arrangement wherein the name or designation of the article itself may be permanently imprinted on the face of the holder, and the price slips themselves are made of suitable transparent material, such as Celluloid or the like, and the price digits and other indicia are imprinted on these price slips; the digits and other indicia on the price slips being so placed thereon that when said slips are set into place in the holder, the name or other indicia which is permanently imprinted on the holder will be visible through the transparent slips, and such that the digits and other indicia on the slips will not interfere with the permanently imprinted name or indicia on the face of the holder, whereby both the holder and the price slips co-operate with each other to provide a complete indication of the name and the price of sale of the article.

Other objects and uses of the invention will appear from a detailed description of the same, which consists in the features of construction and combinations of parts hereinafter described and claimed.

In the drawing:

Figure 1 shows a face view of a price ticket embodying the features of my present invention, the front face of the holder being provided with the name or indicia of an article permanently imprinted thereon, and three transparent slips being set into place in the holder for designating the price of the article;

Figure 2 shows an end edge view corresponding to Figure 1; and

Figure 3 shows a view similar to that of Figure 2, but showing a modified form of device.

The arrangement illustrated includes the holder 5 of sheet Celluloid or other suitable material, having its upper and lower edges folded over to provide the grooved edges 7 facing towards each other and adapted to receive the edges of the price slips which are slipped into and out of the holder from time to time. The holder may be provided with suitable means for attachment directly to the article to which it refers. For example, the U-shaped wire prong member 11 may be made with its upper end suitably connected to the back face of the holder, leaving the downwardly extending pointed prongs which may be pierced into the cut of meat or other object to which the price ticket refers.

The holder 5 has the name or other suitable indicia relating to the article permanently imprinted on its front visible face. In the illustration of the drawing this is the name "Tenderloin steak." This permanent imprinting is preferably near one edge (the top edge being shown in the figures), so that the indicia of prices or other information displayed by the removable slips will not interfere with or be confused with such permanently imprinted matter. The front face of the holder is designated by the numeral 6 in the drawing. Suitable price slips 8 are removably slipped into the holder, their upper and lower edges being received by the grooves 7 of the holder as clearly evident. Each of these price slips carries a suitable legend or indicia, and the slips themselves are of suitable transparent material, such as Celluloid, and their legends or indicia are so located that when the slips are set into place these legends or indicia will not interfere with the permanently imprinted material on the face of the holder. Thus, in the arrangement shown, these price legends on the slips are placed lower down than the permanently imprinted material on the face of the holder, so that such price legends or indicia appear beneath the name. In case the length occupied by the combination of price slips set into place is less than the length of the permanently imprinted legend on the face of the holder, as shown in Figure 1, a portion of the permanent imprinting will appear at the ends of the price slip space, and another portion will appear through the transparent price slips; but in any case all of the permanent imprinting will appear, and the transparency of the price slips is such that said slips do not materially interfere with the showing of all portions of the permanently imprinted matter.

It will be evident with this arrangement it is only necessary for the user to carry in stock one holder for each article or type of article to be priced, and he may then suitably substitute new or different price slips from time to time, according to the varying prices of the articles. This will greatly reduce the cost of installation of the system, and will also reduce the number of parts which he must have in stock, with consequent reduction of confusion and likelihood of loss of the parts.

In the drawing, the permanently imprinted indicia are designated by the numerals 6, and the price or other indicia on the slips are designated by the numerals 9 and 10. Manifestly, many other combinations of numerals and indicia may be used, than the ones shown in the drawing, and these are shown merely by way of illustration.

In the modified arrangement of Figure 3, the holder plate 12 is flat, and the slips 13 are provided with edge folds 14 which provide grooves to receive the edges of the holder plate, this being merely a reversal of the groove arrangement of Figures 1 and 2; but in the arrangement of this Figure 3 the wording and lettering or indicia on the face of the holder, and on the slips, is the same as the arrangement of Figures 1 and 2; and the slips of Figure 3 are made of transparent material, such as Celluloid, in manner similar to that of Figures 1 and 2 already explained.

This application is a continuation in part of my co-pending application for improvements in Price tickets, Serial No. 192,921, filed February 28, 1938, insofar as concerns the showing of Figures 1 and 2; and is filed in accordance with the requirement for a division of that case.

While I have herein shown and described only certain embodiments of the features of my invention, still I do not intend to limit myself thereto, except as I may do so in the claims to follow.

I claim:

1. As a new article of manufacture, a display unit intended for direct attachment to an article to which said unit refers, said unit including a flanged holder in the form of a plate having oppositely disposed co-operating flanges, a name or legend permanently imprinted on the face of said holder adjacent to one flange, a removable slip of transparent material of size to engage and be held by said flanges and overlie the so permanently imprinted name or legend, and carrying another character related to the permanently imprinted name or legend, said character being so placed on said slip that said character and said name or legend are non-registering with each other when the slip is in place in the holder, and said character and said name or legend do not interfere with each other, whereby said name or legend may be permanently displayed in conjunction with a transitory display of the character on the slip, and without interference of the said character of the slip with the name or legend of the holder face, substantially as and for the purpose set forth.

2. As a new article of manufacture, a display unit intended for direct attachment to an article to which said unit refers, or the like, said unit including a flanged holder in the form of a plate having oppositely disposed co-operating flanges, a name or legend permanently imprinted on the face of said holder in one location, a removable slip of transparent material of size to engage and be held by said flanges and overlie the so permanently imprinted name or legend, and carrying another character related to the permanently imprinted name or legend, said character being so placed on said slip that said character and said name or legend are non-registering with each other when the slip is in place in the holder, and said character and said name or legend do not interfere with each other, whereby said name or legend may be permanently displayed in conjunction with a transitory display of the character on the slip, and without interference of the said character of the slip with the name or legend of the holder face, substantially as and for the purpose set forth.

JOHN B. CARROLL.